(12) United States Patent
Oliver

(10) Patent No.: US 12,309,129 B2
(45) Date of Patent: May 20, 2025

(54) SECURITY MODULE AND METHOD OF SECURE COMMUNICATION

(71) Applicant: OLIVE INNOVATIONS LTD, Chatham (GB)

(72) Inventor: Paul Oliver, Chatham (GB)

(73) Assignee: OLIVE INNOVATIONS LTD, Chatham (GB)

(*) Notice: Subject to any disclaimer, the term of this patent is extended or adjusted under 35 U.S.C. 154(b) by 113 days.

(21) Appl. No.: 18/225,295

(22) Filed: Jul. 24, 2023

(65) Prior Publication Data

US 2023/0370440 A1     Nov. 16, 2023

Related U.S. Application Data

(63) Continuation of application No. PCT/GB2022/051214, filed on May 13, 2022.

(30) Foreign Application Priority Data

Aug. 5, 2021 (GB) ..................................... 2111310

(51) Int. Cl.
*H04L 9/40* (2022.01)
*H04L 9/08* (2006.01)

(52) U.S. Cl.
CPC ........ *H04L 63/0485* (2013.01); *H04L 9/0819* (2013.01)

(58) Field of Classification Search
CPC ................................................ H04L 63/0485
See application file for complete search history.

(56) References Cited

U.S. PATENT DOCUMENTS

| | | | |
|---|---|---|---|
| 9,871,772 B1* | 1/2018 | Weinstein | ............. H04L 63/062 |
| 10,177,911 B2 | 1/2019 | Nix | |
| 10,193,690 B1 | 1/2019 | Self et al. | |
| 2008/0092239 A1 | 4/2008 | Sitrick et al. | |

(Continued)

FOREIGN PATENT DOCUMENTS

WO      2023012444 A1     2/2023

OTHER PUBLICATIONS

United Kingdom Intellectual Property Office Search Report for United Kingdom patent application GB2111310.5, dated Apr. 20, 2022.

*Primary Examiner* — Simon P Kanaan
(74) *Attorney, Agent, or Firm* — Basil M. Angelo; ANGELO IP

(57) ABSTRACT

A computer-implemented method for generating and transmitting a Command data packet including Command data having a plurality of attributes associated therewith. A user control device receives a time-limited encryption key generated using a base key selected according to a specific one or more of the attributes. The user control device also receives a Checksum value representative of at least the specific one or more attributes. The Command data is encrypted using the time-limited encryption key, and a Command data packet is constructed having a plain value header and an encrypted Command Payload that includes at least the encrypted Command Data. The plain value header includes data representative of Checksum value and the subset of the plurality of attributes of the Command data except the specific one or more attributes used by the key issuing platform to select the base key.

17 Claims, 8 Drawing Sheets

(56) References Cited

U.S. PATENT DOCUMENTS

| | | | |
|---|---|---|---|
| 2016/0188317 A1* | 6/2016 | Hilliar | H04L 67/34 |
| | | | 717/172 |
| 2016/0241524 A1 | 8/2016 | Fascenda et al. | |
| 2023/0216947 A1* | 7/2023 | Bernardi | H04L 67/10 |
| | | | 713/150 |

* cited by examiner

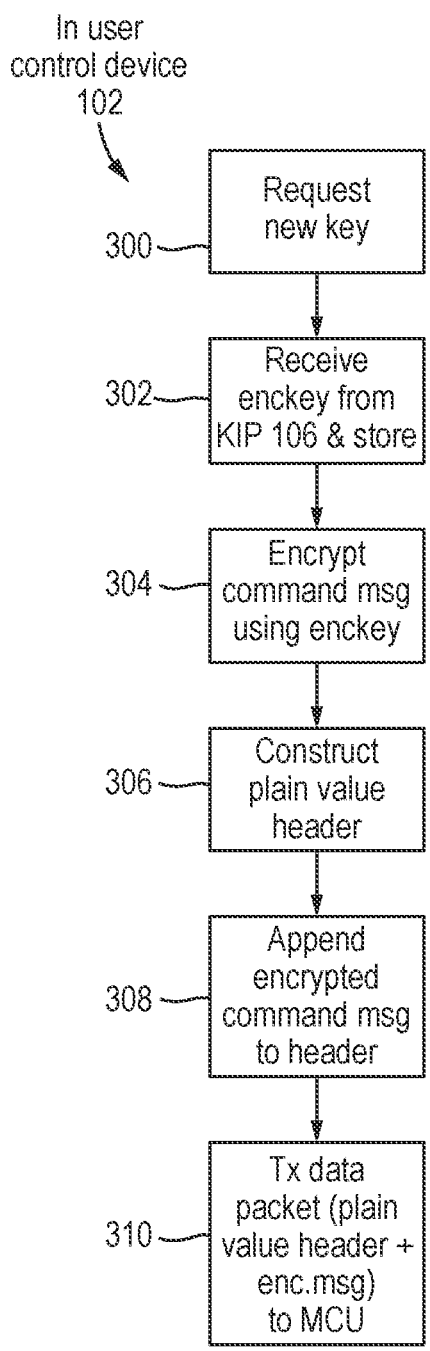
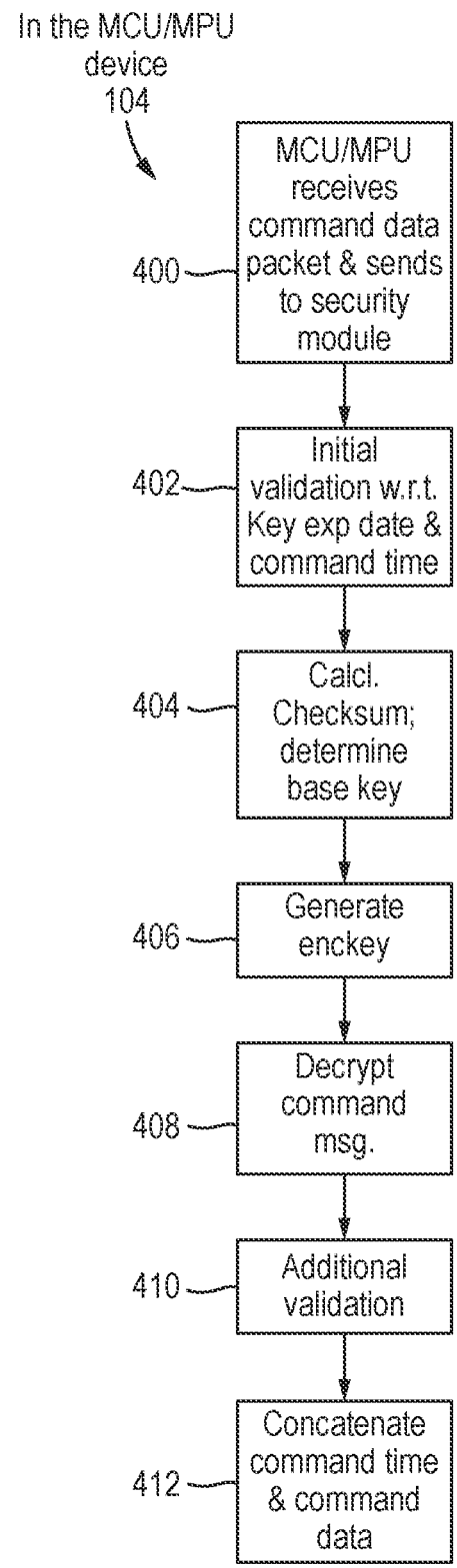

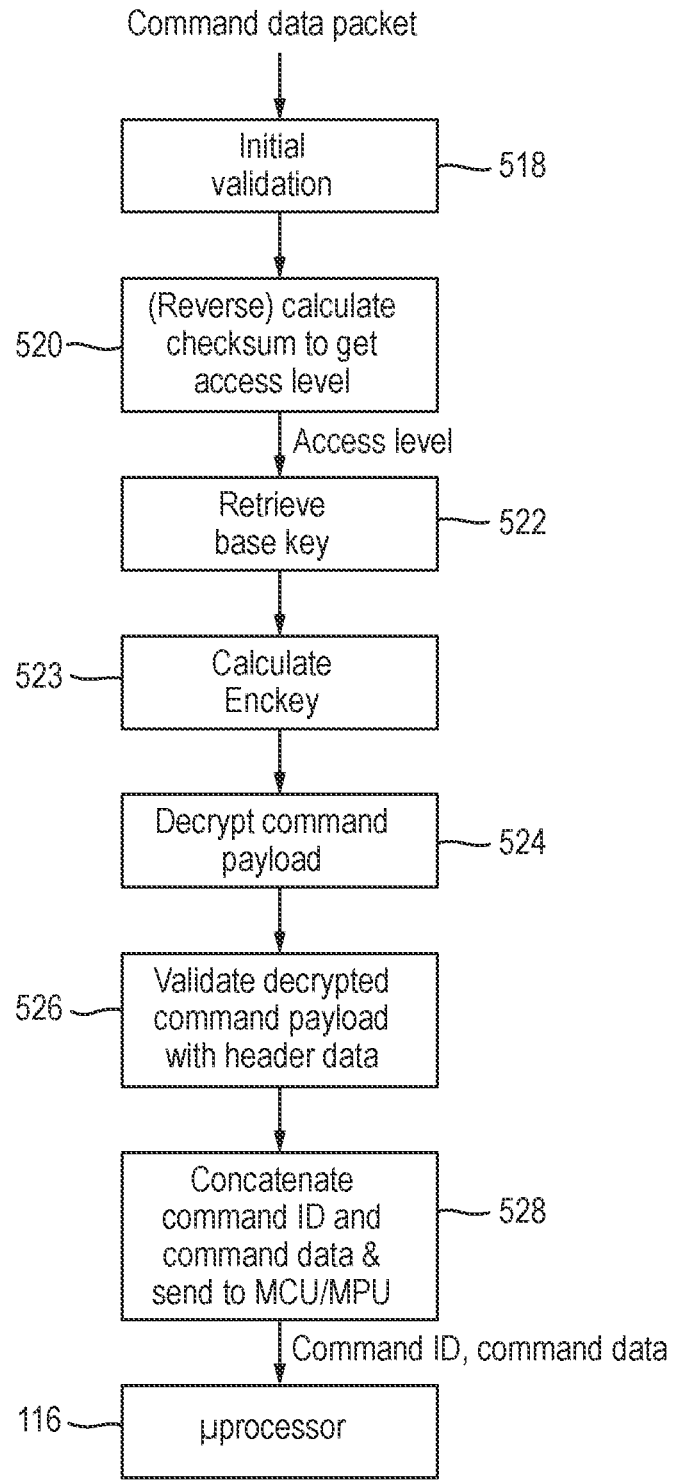

HMACSHA256 (Base key 1, checksum

Command body (unencrypted)

| Owner ID | Command time | Command length | Command ID | Command data |
|---|---|---|---|---|
| 1001 | 20210222 12:30 | 4 | 2000 | Open |

| 1001 | 20210222 12:30 | 4 | 2000 | Open | SHA256... |
|---|---|---|---|---|---|

|←Signature→|

Command data packet

| Key exp date | Command time | Owner ID | Checksum | Command IV | Command body |
|---|---|---|---|---|---|
| 20210301 | 20210222 12:30 | 1001 | 204301442 | 1234567890 123456 | (Encrypted) |

Fig. 6C
Command body (decrypted)
| Owner ID | Command time | Command length | Command ID | Command data |
| Signature (SHA256) |
| d∅5ae941...........628a7b |
| Command ID | Command data |
| --- | --- |
| 2000 | Open |
| Command ID | Command data | Signature |

SECURITY MODULE AND METHOD OF SECURE COMMUNICATION

CROSS-REFERENCE TO RELATED APPLICATIONS

This application is a continuation of PCT International Application PCT/GB2022/051214, filed on May 13, 2022, which claims the benefit of, or priority to, United Kingdom Patent Application 2111310.5, filed on Aug. 5, 2021, all of which are hereby incorporated by reference in their entirety for all purposes.

FIELD OF THE INVENTION

This invention relates generally to a method of secure communication between a client device and a server, and a communication security module configured to perform such a method.

BACKGROUND OF THE INVENTION

Cyber security, and, in particular, the security of network devices configured to receive and implement Command messages from a number of different client devices, is an ever-evolving field of technology. As cyber-attacks become more sophisticated, so cyber security software and hardware evolves to fulfil the fundamental need to allow Command messages from some client devices to reach the MCU and to block those from others, whether because they represent a malicious attack or simply originate from an unauthorised user.

The most common form of security utilised in network devices is known as a firewall. A firewall is a computer network security system (or module) that restricts data packets into, out of, or within a private network. It comprises a software or dedicated hardware-software unit that blocks or allows data packets based on a predetermined security ruleset, and is typically intended to prevent anyone, inside or outside a private network, from engaging in unauthorised communication and to help prevent malicious activity. Thus, firewalls can be viewed as 'gateways' that manage the travel of permitted and prohibited data packets (usually web activity) in a private network.

In recent years, it has become common for applications to use forms of encryption as an additional layer of protection for data being transmitted between device, over a public and private communications network. For example, in recent years, email applications especially often use Transport Layer Security (TLS), which is an encryption policy derived from the earlier version known as Secure Sockets Layer (or SSL). In order to participate in data communication using TLS, the sending and receiving device must have a security certificate (issued by a trusted authority). When, for example, an email is to be sent, the intended recipient sends its security certificate and public encryption key to the sender. The sender encrypts the message with the public encryption key and transmits the encrypted message to the recipient device. The recipient device can then decrypt the message using its private key. This is known generally as Public Key Cryptography (PKC) and will be well known to a person skilled in the art of cyber security. However, this type of security does not lend itself to use with a MCU (or MPU), which is typically dedicated to a single function, and is most often embedded in another device (e.g., a household electronic device), because the processing and storage overhead, and additional power consumption, required to support a PKC protocol makes it prohibitive. Also, if the recipient server has no access to the key issuing platform, new client devices could not communicate with it. Thus, for example, a IoT device, with limited processing and communication functionality, could (in theory) be pre-configured to receive PKC encrypted data packets from a small number of specified client devices, but it would not be able to receive such data packets from other, unknown client devices. This limits the usefulness of PKC as a form of security for some applications.

Another known type of security protocol is known as HTTPS, wherein a client and server establish a TCP connection, followed by an SSL/TLS handshake process, and finally encrypted application data is permitted to pass between them. Once again, the server needs to be client-aware and store valid user credentials in order to distinguish between them. These initial certification validation must be performed against a certificate authority, and also requires a method of authentication and authorisation for the applications themselves. Furthermore, certificates are only valid for a certain period of time and, therefore, the server must periodically refresh certificates. Thus, the server requires internet access and suitable software (and processing functionality) to utilise HTTPS.

Yet another known security protocol is SSH, in which the server generates a public/private key pair for a user; the user is given the private key and the server stores the public key for that user. When a connection is initiated between a client and the server, the server sends (to the client) a random message. The client encrypts this message with the private key for its user for that server, and the encrypted message is sent to the server. The server decrypts the encrypted message with the user's public key and, if the decrypted message and the original message match, authentication is passed, and the client and server agree a session key which is used to encrypt all subsequent messages during that session. Thus, a process is required to generate user key pairs, and to share them with the clients before any authentication or communication can take place). The server is required to store the user key pairs, and, for each new session, a new key is required. Thus, not only does the server require network connectivity to support communication from a new client, but there is a massive storage overhead if large numbers of clients need to be supported along with their respective key pairs.

There are other known security protocols, such as those involving authentication by an External Identity Provider (EIP), but these types of protocol, like those described above, require an internet connection to allow access to the authentication server so as to verify that a token sent by a user is valid. For example, 4G and 5G communications networks make use of a dedicated Security Anchor Function (SEAF) which can issue a shared or "public" key for use by the base stations and user equipment in a communications system. For example, EP3576446 describes a security implementation method which results in a handover command being transmitted to a UE and, thus, an inter-AMF handover between two different communications systems in a communications network is achieved. The handover command message is accompanied by security context data related to the target communication system and could be any one or more of a number of characteristics, including a security key lifetime, a key index, or a counter related to key calculation. It may also include a specific key. The UE generates a security key using an intermediate key and the security context of the target communications system. The handover command is not encrypted, nor does it need to be, since the ultimate goal is for the UE to generate a security key using the SEAF key and the security context data, that security key essentially being the "private" key for that UE for communications after the handover has occurred. In fact, the method is not unlike the SSH method described above, and it does not address the technical problems described above. It is highly unsuitable for smaller communications networks because the overhead required to support a dedicated SEAF is prohibitive for many (if not, most) applications. The number of communications that need to precede the handover command message, the processing and storage overhead required to implement the method on a large scale (as intended), and the need for a network connection in order to process the handover command message are all technical drawbacks that prevent the security method from being adapted for use in anything other than a large communications network. Furthermore, the handover command is, of necessity, in a specified format and generated in accordance with a specified protocol. The method described does not lend itself to enabling the UE to receive command messages in any format and encrypted using any protocol. It is specifically designed to enable handover of a UE from a 4G eNB to a 5G gNB.

It will be self-evident to a person skilled in the art that MCUs intended for industrial and IoT applications are, of necessity, limited in power and functionality, and are not readily adapted to utilise any of the security protocols described above.

In the current state of the art, this leaves only conventional firewalls to attempt to control data communication to or from a server. In a conventional firewall arrangement, the client constructs a packet of data which includes a destination address, a protocol, and a destination port. The firewall is configured with allowed rules that determine which client address, port and protocol can send messages to which address, port, and protocol. If the packet matches the allowed rules, it is sent on. There is often no encryption of data at all and, if there is, it is the responsibility of the client and server, and is achieved by pre-agreeing or negotiating a key using one of the above-described methods (i.e., SSL/TLS or PKC), and requires that the receiving device has internet access and sufficient storage and processing overhead to manage all of the user keys that need to be generated and stored.

However, in the wake of increasingly widespread implementation of IoT devices, which tend to be normally offline (to save power) and have minimal storage and processing capacity (to minimise cost and, to an extent, size), the inventor has identified a need for a new method of authenticating data packets received by a server, that does not require the server to connect to the internet nor requires any external intervention to authenticate a new client when a data packet (command message) is received from a client device (by any means, including Bluetooth®, SERIAL, HTTP, UART, etc.), is able to process command messages from an unlimited number of different clients without having to store their individual keys and without the need to store rules about them or the data they are allowed to send. Therefore, it is an object of aspects of the present invention to address at least one or more of these technical issues.

BRIEF SUMMARY OF THE INVENTION

In accordance with a first aspect of the invention, there is provided a computer-implemented method, performed in a user control device, for generating and transmitting a Command data packet including Command data configured to operate a control unit, the Command data having a plurality of attributes associated therewith, the method including, under control of a processor of said user control device: requesting, from a remote key issuing platform, a time-limited encryption key, and receiving said time-limited encryption key from said key issuing platform, said time-limited encryption key being generated by said key issuing platform using a base key selected according to a specific one or more of said attributes associated with said Command data; receiving, with said time-limited encryption key from said key issuing platform, a Checksum value representative of at least a subset of said plurality of attributes of said Command data including said specific one or more attributes used by the key issuing platform to select the base key; encrypting at least said Command data using said time-limited encryption key; constructing a Command data packet including a plain value header and an encrypted Command Payload, said plain value header including: data representative of said subset of said plurality of attributes of said Command data except the specific one or more attributes used by the key issuing platform to select the base key; and said Checksum value; said Command payload including at least the encrypted Command Data; and transmitting said Command data packet to a said control unit.

In an embodiment, the method may further include receiving, with said time-limited encryption key from said key issuing platform, a key expiry date and including data representative thereof in said plain value header of said Command data packet.

Optionally, requesting a time-limited encryption key may include generating request data including data representative of the user control device and the control unit to which a Command data packet is required to be transmitted, and transmitting said request data to said remote key issuing platform.

In an embodiment, constructing a Command data packet may include: constructing a plain value data package including said Command data and a plurality of attributes associated therewith, generating a signature in respect of said plurality of plain value attributes and appending said signature to said plain value data package to generate a signed data package; encrypting, using said time-limited encryption key, said signed data package to generate an encrypted Command payload; and appending said encrypted Command payload to said plain value header.

The plain value header may include data representative of a Command time extracted from a real time clock of said user control device, and an owner ID representative of a user of said user control device.

According to another aspect of the present invention, there is provided a computer-implemented method, performed in a control unit including a security module and a control processor, for receiving, validating, and implementing valid Command data received from a user control device, said security module having stored therein a plurality of base keys, the method including, under control of a processor of said security module: receiving a Command data packet from a user control device, said Command data packet including a plain value header and an encrypted Command Payload, said Command payload including at least Command data encrypted by a time-limited encryption key; said plain value header including: data representative of said subset of said plurality of attributes of said Command data except the specific one or more attributes used by a key issuing platform to select a base key from which said encryption key was generated; and said Checksum value; using attribute data contained in said plain value header and said Checksum value, determining said one or more specific attributes; selecting a base key from said stored base keys associated with said specific one or more attributes; using said selected base key to calculate said encryption key; using said encryption key to decrypt said Command payload including said Command data; and forwarding said decrypted Command data to said control processor.

In an embodiment, the method may further include using said selected base key and said Checksum value to calculate said encryption key.

The plain value header may include data representative of a key expiry date and/or time associated with said Command data packet, and the method further includes checking said key expiry date against the date and/or time held in a real time clock of said security module.

In an embodiment, one of said Command data attributes may be a Command time and data representative thereof may be included in the plain value header of the Command data packet, and the method may further include comparing said Command time against previously-stored Command times and/or a time held by a real time clock of the control unit to determine if the Command time is valid and, if not, discarding said Command data packet.

In accordance with a further aspect of the present invention, there is provided a computer-implemented method performed in a key issuing platform for generating time-limited encryption keys for use by one or more remote user control devices in relation to one or more control units, the method including, under control of a processor of the key issuing platform: receiving a request for a time limited encryption key from a remote user control device, said request including data representative of said user control device and a control unit to which it wishes to issue Commands; determining one or more specific Command data attributes and selecting, from a set of stored base keys, a base key corresponding to said one or more specific Command data attributes; calculating a Checksum value representative of at least a subset of a plurality of attributes of said Command data including said specific one or more Command data attributes used to select the base key; calculating an encryption key using said selected base key; and transmitting said encryption key to a said user control device, together with data representative of said Checksum value and said key expiry date.

In an embodiment, the encryption key may be calculated using said base key and said Checksum value.

In accordance with another aspect of the invention, there is provided a computer-implemented security module for integration onto a control unit chip, the security module having a processor and a memory and a stored plurality of base keys, and is configured, under control of the processor, to execute instructions stored in the memory to: receive a Command data packet from a user control device, said Command data packet including a plain value header and an encrypted Command Payload, said Command payload including at least Command data encrypted by a time-limited encryption key; said plain value header including: data representative of said subset of said plurality of attributes of said Command data except the specific one or more attributes used by a key issuing platform to select a base key from which said encryption key was generated; and said Checksum value; use attribute data contained in said plain value header and said Checksum value, determine said one or more specific attributes; select a base key from said stored base keys associated with said specific one or more attributes; use said selected base key to calculate said encryption key; use said encryption key to decrypt said Command payload including said Command data; and forward said decrypted Command data to a control processor of the control unit.

Another aspect of the present invention provides a computer-implemented control unit including an integrated circuit having a control processor and security module, the security module having a processor, a memory, and a stored plurality of base keys, and is configured, under the control of the processor, to execute instructions stored in the memory to: receive a Command data packet from a user control device, said Command data packet including a plain value header and an encrypted Command Payload, said Command payload including at least Command data encrypted by a time-limited encryption key; said plain value header including: data representative of said subset of said plurality of attributes of said Command data except the specific one or more attributes used by a key issuing platform to select a base key from which said encryption key was generated; and said Checksum value; use attribute data contained in said plain value header and said Checksum value, determine said one or more specific attributes; select a base key from said stored base keys associated with said specific one or more attributes; use said selected base key to calculate said encryption key; use said encryption key to decrypt said Command payload including said Command data; and forward said decrypted Command data to said control processor.

Yet another aspect of the invention provides a computer-implemented user control device including a processor and a memory, and being configured, under control of the processor, to execute instructions stored in the memory to: request, from a remote key issuing platform, a time-limited encryption key, and receiving said time-limited encryption key from said key issuing platform, said time-limited encryption key being generated by said key issuing platform using a base key selected according to a specific one or more of said attributes associated with said Command data; receive, with said time-limited encryption key from said key issuing platform, a Checksum value representative of at least a subset of said plurality of attributes of said Command data including said specific one or more attributes used by the key issuing platform to select the base key; encrypt at least said Command data using said time-limited encryption key; construct a Command data packet including a plain value header and an encrypted Command Payload, said plain value header including: data representative of said subset of said plurality of attributes of said Command data except the specific one or more attributes used by the key issuing platform to select the base key; and said Checksum value; said Command payload including at least the encrypted Command Data; and transmit said Command data packet to a said control unit.

In accordance with a further aspect of the invention, there is provided a computer-implemented cryptographic key issuing platform including a processor and a memory and being configured, under control of the processor, to execute instructions in the memory to: receive a request for a time limited encryption key from a remote user control device, said request including data representative of said user control device and a control unit to which it wishes to issue Commands; determine one or more specific Command data attributes and select, from a set of stored base keys, a base key corresponding to said one or more specific Command data attributes; calculate a Checksum value representative of at least a subset of a plurality of attributes of said Command data including said specific one or more Command data attributes used to select the base key; calculate an encryption key using said selected base key; and transmit said encryption key to a said user control device, together with data representative of said Checksum value and said key expiry date.

An aspect of the present invention extends to a computer program product including instructions for implementing the method substantially as described above.

Another aspect of the invention extends to a computer program including instructions for implementing the method substantially as described above.

Another aspect of the invention extends to a non-transitory storage medium storing instructions which, when executed by a processor, cause the processor to perform the method substantially as described above.

In accordance with yet another aspect of the invention, there is provided a communications system including a client device, a server and a key issuing platform, the server having an integrated security module, the client device being communicably couplable to the server via a specified communications link, the client device having an input for receiving an encryption key from the key issuing platform via said communications network and an output for transmitting an encryption key request to the key issuing platform and an output for transmitting a Command data packet to said server; the key issuing platform being configured to, under control of a processor, to execute instructions in a memory to: receive a request for a time limited encryption key from said client device, said request including data representative of said client device and a server to which it wishes to issue Commands; determine one or more specific Command data attributes and select, from a set of stored base keys, a base key corresponding to said one or more specific Command data attributes; calculate a Checksum value representative of at least a subset of a plurality of attributes of said Command data including said specific one or more Command data attributes used to select the base key; calculate an encryption key using said selected base key; and transmit said encryption key to a said client device, together with data representative of said Checksum value and said key expiry date; the client device being configured to, under control of a processor, to execute instructions to: receive, with said time-limited encryption key from said key issuing platform, a Checksum value representative of at least a subset of said plurality of attributes of said Command data including said specific one or more attributes used by the key issuing platform to select the base key; encrypt at least said Command data using said time-limited encryption key; construct a Command data packet including a plain value header and an encrypted Command Payload, said plain value header including: data representative of said subset of said plurality of attributes of said Command data except the specific one or more attributes used by the key issuing platform to select the base key; and said Checksum value; said Command payload including at least the encrypted Command Data; and transmit said Command data packet to a said server; and the server being configured transfer a received Command data packet to said security module, the security module being configured, under control of a processor, to execute instructions in a memory to: receive a Command data packet from a client device, said Command data packet including a plain value header and an encrypted Command Payload, said Command payload including at least Command data encrypted by a time-limited encryption key; said plain value header including: data representative of said subset of said plurality of attributes of said Command data except the specific one or more attributes used by a key issuing platform to select a base key from which said encryption key was generated; and said Checksum value; use attribute data contained in said plain value header and said Checksum value, determine said one or more specific attributes; select a base key from said stored base keys associated with said specific one or more attributes; use said selected base key to calculate said encryption key; use said encryption key to decrypt said Command payload including said Command data; and forward said decrypted Command data to a control processor of the server.

As will be apparent hereinafter, the aspects of the present invention can offer a security method, device and protocol that can be configured to identify commands from an unlimited number of user control devices, each of which may have different permissions and/or access levels for different periods of time, wherein no network connectivity is required for operation nor is there any reliance on another service for verification or storage of certificates, and commands can be processed in real time. Thus, a security module according to an exemplary embodiment of the invention works offline, accommodates an unlimited number of unknown users, requires low power and storage overhead, does not require keys to be shared with or from third parties, and requires no default passwords. These and other aspects of the invention will be apparent from the following detailed description.

BRIEF DESCRIPTION OF THE DRAWINGS

An embodiment of the present invention will now be described, by way of example only, and with reference to the accompanying drawings, in which:

FIG. 3 is a schematic process diagram illustrating the principal steps of an example method performed in a user control device in a control system such as that illustrated schematically in FIG. 2.

FIG. 4 is a schematic process diagram illustrating the principal steps of an example method performed in an integral security module of an MCU/MPU device in a control system such as that illustrated schematically in FIG. 2.

FIG. 5C is a schematic diagram illustrating an example process in a security module according to an exemplary embodiment of the present invention.

FIG. 6C is a schematic diagram illustrating the data transforms associated with the process of FIG. 5C.

DETAILED DESCRIPTION OF THE INVENTION

Figure 1:
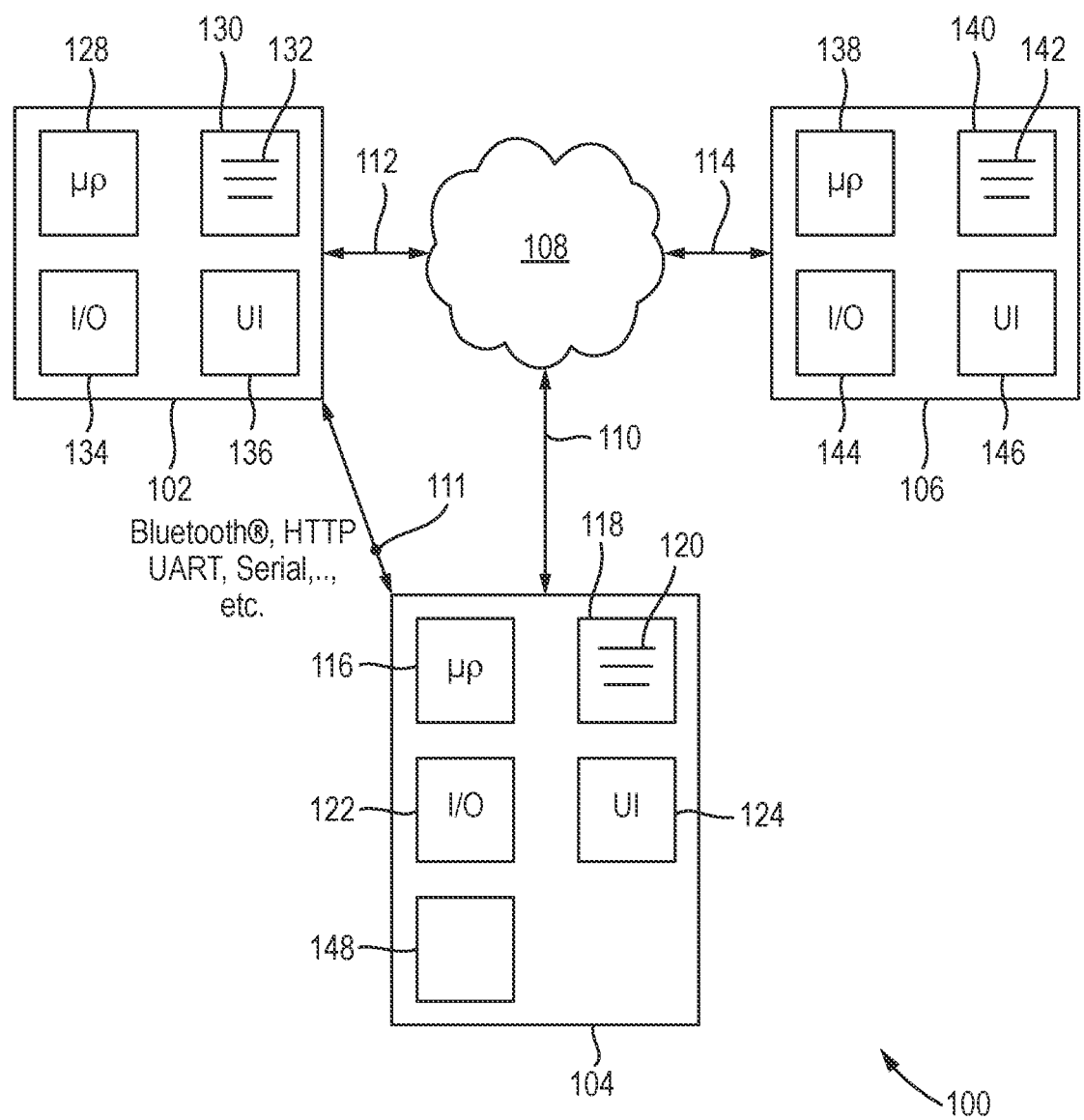
FIG. 1 is a schematic block diagram illustrating a communications system including a server or MCU/MPU device having an integral security module according to an exemplary embodiment of the present invention.

A Microcontroller or MCU is an integrated circuit that consists of a processor unit, memory modules, communication interfaces and peripherals. As will be apparent to those skilled in the art, the biggest difference between an MCU and a microprocessor (together with the peripherals it needs to work) is that it is designed to be as small, and use as little power, as possible, it is typically dedicated to a single function, and most often embedded in other devices (e.g., household electronics). Accordingly, this keeps the cost and complexity of the product in which it is embedded as low as possible. The MCU is used across a broad range of applications, including washing machines, robots, drones, radio and game controllers, and all manner of IoT devices.

The drawback of the MCU is, of course, its inherent lack of security. As it is typically dedicated to a single function, and intended to consume as little power as possible, it is often designed to remain offline unless it requires a connection for some specific reason (e.g., for remote maintenance, for example). The complete device, including all of the RAM, ROM and peripherals it needs is provided on a single, tiny (low power) microchip, and this is made possible because it has only the limited functionality it needs for the application at hand and (often) no more. Therefore, it is often the case that there is no security associated with the MCU, which is becoming an increasing problem. An IoT device that is connected to a WiFi router (say) in a home poses a risk to the network (and all of the other devices connected to that network within the home), because it opens up the possibility of an attack, with malware and viruses being introduced to the network via an IoT device and, in some cases, enabling data from any other connected devices to be stolen or corrupted. On the other hand, installing and running protective software, such as a firewall, on the processor of an MCU is difficult without losing the low cost, low power elements that make it attractive in the first place.

Prior art security protocols intended to protect computing devices from such an attack often require internet access to function correctly each time a command message is received, which can significantly increase power consumption. Such protocols may also require storage of user keys, which increases the storage overhead (and size) of the device and limits the number of clients that can communicate with the device. This also requires that the client device is previously known to the server device, in order to store its key in the first place, so it doesn't support use by any number of previously unknown client devices, especially without using internet access and significant processing overhead. The method and apparatus described below address these technical problems, and provide a method of secure communication, and a communications security module, that allow a command message from a previously unknown (but authorised) client device to be received and processed by the MCU, whilst blocking unauthorised data packets, without requiring internet access (such data packets could be transmitted by any known communication means, as will be described in more detail later), without having to store individual client device or user keys, and without increasing the processing overhead or power consumption of the MCU.

Referring to FIG. 1 of the drawings, a communication system is illustrated. The communications system 100 comprises a control unit in the form of a microcontroller unit (MCU) or microprocessor unit (MPU) 104, a key issuing platform (KIP) 106 and a user control device 102. During manufacture of the PCU/MPU device 104, it and the key issuing platform 106 are communicably coupled via a communications network 108 (for example, the Internet) through respective communications links 110, 114, implementing, for example, Internet communication protocols. The MCU/MPU device 104 and the KIP 106 may be able to communicate through other communications networks, such as public switched telephone networks (PSTNs), including mobile cellular communications networks, but these are omitted from FIG. 1 for the sake of clarity. It is to be understood that after manufacture and configuration of the MCU/MPU device 104, there is no need for the MCU/MPU device 104 and the KIP 106 to have any further communication, except in circumstances where an update to the encryption keys is required. The user control device 102 can communicate with the MCU/MPU device 104 through a communications link 111 implementing any number of different communication protocols, including (but by no means limited to) Bluetooth®, HTTP, UART, SERIAL, etc., or even through a communications link 112 implementing, for example, Internet communications protocols, but the present invention is by no means intended to be limited in this regard. Indeed, as will be described later, the user control device(s) can be configured to communicate with the MCU/MPU device 104 via a communication protocol appropriate for the application, and neither device requires a connection to the communications network 108 for transmitting/receiving and validating Command data packets; which is, in fact, one of the key technical advantages of examples of the invention. As the MCU/MPU device 104 does not require an internet connection for receiving or verifying and actioning Command data packets from user control devices 102, it means that additional power consumption can be minimised and security is increased, which makes some examples of the invention highly suitable for IoT devices, amongst other things. The user control device 102 is able to communicate with the KIP 106 via a communications network 108, such as the Internet, via a communications link 110 implementing, for example, Internet communications protocols.

In the example of FIG. 1, the MCU/MPU device 104 may comprise a number of individual components including, but not limited to, one or more microprocessors 116, a memory 118 (e.g. volatile memory such as RAM) for the loading of executable instructions 120 defining the functionality the MCU/MPU carries out under control of the processor 116. The MCU/MPU device 104 also comprises an input/output module 122 allowing the MCU/MPU device 104 to communicate with a user control device 102 via one of a number of (typically, but not essentially, close-range) communications protocols. A user interface 124 is provided for user control and may comprise, for example, a display screen, touchscreen, keypad, or computing peripherals such as monitors, mouse-type input devices or computer keyboards. The functionality of the user interface 124, and the peripherals required, will be dependent on the application in which the MCU/MPU device 104 is being utilised, and the present invention is not necessarily intended to be limited in this regard.

The user control device 102 may comprise a number of individual components including, but not limited to, one or more microprocessors 128, a memory 130 (e.g., a volatile memory such as RAM) for the loading of executable instructions 132, the executable instructions 132 defining the functionality the user control device 102 carries out under control of the processor 128. User control device 102 also comprises an input/output module 134 allowing the user control device 102 to communicate over the communications network 108 and also via other communications protocols (where so configured). User interface 136 is provided for user control. If the user control device 102 is, say, a smart phone or tablet device, the user interface 136 will likely have a touch panel display as is prevalent in many smart phones and other handheld devices. Alternatively, the user control device may have a keypad, keyboard, computer mouse, etc. to enable a user to enter control data. The MCU/MPU device further comprises a security module 148, which is integrated onto the same integrated circuit as the other MCU/MPU device components and is communicably coupled to the processor 116.

The Key Issuing Platform (KIP) 106 may comprise a number of individual components including, but not limited to, one or more microprocessors 138, a memory 140 (e.g., a volatile memory such as a RAM) for the loading of executable instructions 142, the executable instructions defining the functionality the KIP 106 carries out under control of the processor 138. The KIP 106 also comprises an input/output module (which may include a transmitter/receiver module) 144 allowing the KIP 106 to communicate over the communications network 108. In some circumstances, a user interface 146 may be provided for user control by any known input means.

The MCU/MPU device 104 includes an integral security module 148 to which the main MCU/MPU is communicably coupled, as will be described in more detail below.

Figure 2:
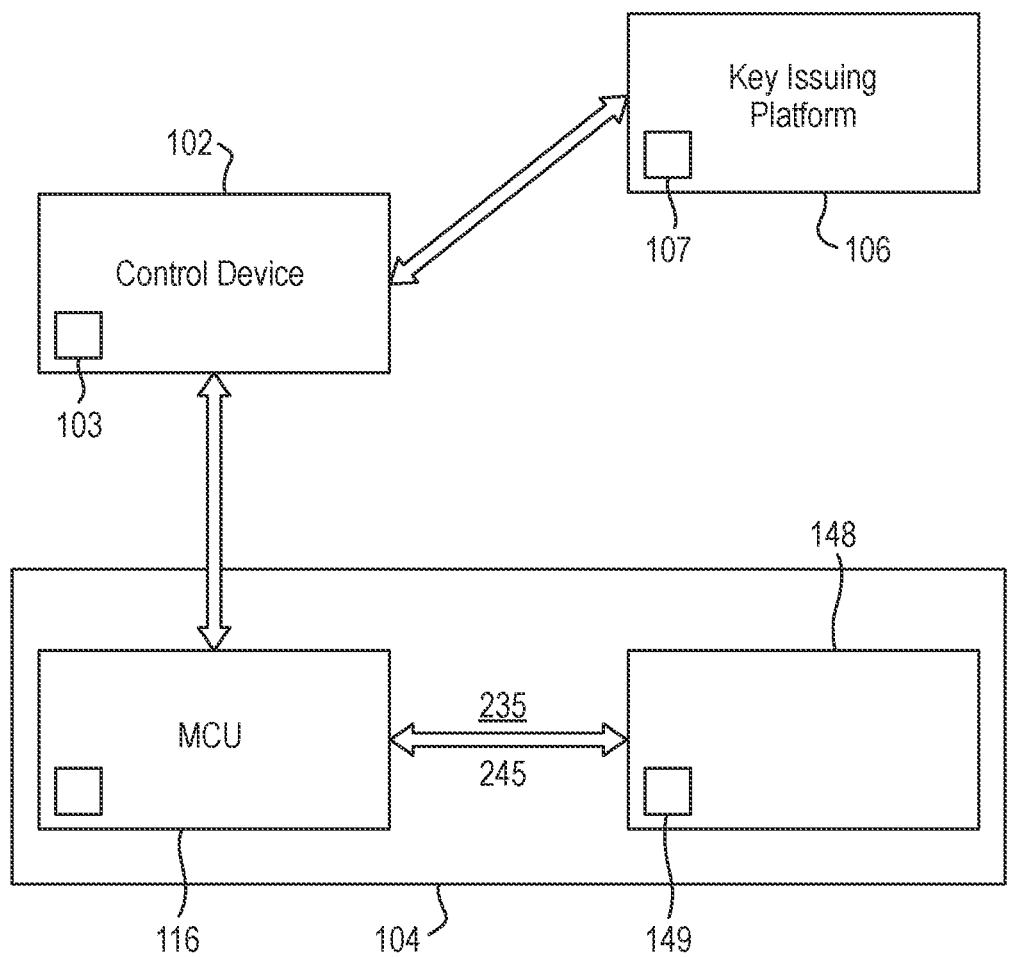
FIG. 2 is a schematic block diagram illustrating a control system including an MCU/MPU device having an integral security module according to an exemplary embodiment of the present invention.

Referring to FIG. 2 of the drawings, the communications security module 148 is integrated into the MCU/MPU device 104 and includes a real-time clock 149, which is used for generation of time limited encryption keys and validation of incoming data packets (also referred to herein as Command data packets).

The communications security module 148 (also referred to herein simply as the security module 148) has a plurality of (n) base encryption keys. These base encryption keys are used to generate time-limited encryption keys that are used to decrypt and verify the Command payload of a Command data packet received from a user control device 102.

The KIP 106 is physically separate from the MCU/MPU device 104 (including the integral security module 148), and has the same n base encryption keys as the security module 148, as well as a real-time clock 107. The base encryption keys held by the KIP 106 are used to generate time-limited encryption keys for use by a user device 102 to encrypt and sign data for transmission to the MCU/MPU device 104. The encrypted data packets comprise a plain value header and a Command payload that comprises data encrypted using a time-limited encryption key provided by the KIP 106, as will be described in more detail hereinafter. However, it is important to note that the plain value data provided in the header is sufficient for the security module 148 of the MCU/MPU device 104 to determine the time-limited encryption key used to encrypt the Command message, thus enabling it to decrypt the message and return it to the MCU/MPU for processing and action. The security module 148 does not require any communication with the KIP 106 during the validation and decryption process, which means that the additional power consumption overhead of the security module 148 integrated into the MCU/MPU device 104 is negligible, and it also means that the invention can be used in applications where the MCU/MPU device is rarely actually connected to the Internet, making it ideal for use in IoT devices, vehicle security entrance security, etc.

Referring to FIG. 3 of the drawings, in a broad overview of a first part of an example process, at step 300, a user control device 102 transmits a request (via communications network 108, for example) to the KIP 106 for an encryption key because it wishes to send a Command message to the MCU/MPU device 104. In response to the request, the KIP generates a time-limited encryption key which is specific to a Command type or Access level permitted by the user control device. In fact, the base key is selected from the n base keys held by the KIP 106 based on the access level permitted by the user, which is based on the user data it holds. The Access level may also define the time period for which the encryption key will be valid, and that enables the KIP to calculate a key expiry date. Once the user data has been verified and the Access level determined, the base key is selected and the encryption key can be generated by performing, for example, a keyed hash function in respect of the base key and selected data associated with the user and the Command message they wish to send, as will be described hereinafter.

In more detail, the encryption key is generated by performing a keyed hash function in respect of the selected base key and a checksum derived from a combination of multiple different values associated with the Command message. In an exemplary embodiment, the checksum may be an arithmetic sum of multiple such values. One of these values is data representative of the Access level (or the Access level number itself). Other of these values could include data representative of the user, data representative of the MCU/MPU device to which the command message is to be sent, and/or the key expiry date (or data representative thereof). In some cases, only one or two of these latter values could be used, but that would reduce the level of security afforded by the example. Additional data items could also be included, which would increase security but also complexity and processing overhead.

In an example, a user ID, a (MCU/MPU) device ID, an Access Level number and the key expiry date are arithmetically summed to generate the checksum, and the encryption key is generated by the KIP 106 by performing a cryptographic algorithm, such as a keyed hash function, in respect of the base key (selected according to the Access level of the user) and the checksum.

It is conceivable that the checksum could be calculated using a different equation or algorithm and that different data could be used for this. However, there are key elements: the security module 148 must know how the checksum was calculated; the security module must know the criteria upon which the base key is selected; and the checksum should include data representative of the criteria upon which base key was selected. So, in this example, the base key is selected according to the Access level. Therefore, data representative of the Access level is included in the checksum. However, if the base encryption key were to be selected on the basis of some other criterion, for example, Command type, then data representative thereof would need to be included in the checksum calculation.

In this example, an arithmetic sum of the various identifying data is used to generate the checksum. This is considered to be one of the simplest options. However, other equations and algorithms could be considered, provided the security module knows what they are.

Returning to FIG. 3 of the drawings, the security module 150 of the user control device 102 receives the encryption key at step 302. At step 304, the user control device encrypts the Command message using a suitable cryptographic algorithm, as will be known to a person skilled in the art, and the encryption key. Then, the user control device 102 constructs a plain value header, at step 306. The plain value header should include sufficient data to allow the security module 148 to determine how the base encryption key was selected by the KIP 106 and, therefore, enable it to select the same base encryption key from its own store, recreate the encryption key and, therefore, decrypt the Command message. In an example, therefore, the plain value header may include data items representative of all of the values used to generate the checksum, except the value that indicates how the base encryption key was selected, and also the data identifying the checksum itself. In an example, the plain value header includes data representative of the key expiry date and the time at which the Command was generated (Command-Time) so that some initial validation checks can be performed by the security module 148 when it receives the Command message (Command data packet), using its own real-time clock 149, as will be described in more detail below. In some examples, the Command data may be signed before it is encrypted, such that the Command data ultimately encrypted includes a cryptographic signature verifying the Command data to which it is appended.

At step 308, the user control device appends the encrypted Command data to the plain value header to construct a Command data packet and, at step 310, it transmits the Command data packet to the MCU/MPU device 104.

It will be appreciated that, whilst an on-chip security module 148 is used in relation to the MCU/MPU device 104, which ensures that there can be no undetected tampering in respect of communications between the security module and the processor 116, no such dedicated module is required in the user control device 102. The key request and Command data packet construction processes can be implemented within an app or other software module running on the user control device. For many applications, key request and Command data packet construction processes can be implemented in a downloadable app configured to communicate with one or more associated controllers. Provided that the KIP and the security module both have access to the same set of base keys and the rules for selecting a base key and generating an encryption key, it is possible to implement the invention in many different ways for many different applications, as will be exemplified later.

Referring to FIG. 4 of the drawings, at step 400, the MCU/MPU device 104 receives the Command data packet at its input/output module 122 and immediately forwards it to the security module 148.

At step 402, the security module uses the plain value header to perform some initial validation checks in relation to the Command message and, specifically the key expiry date and the time at which the command was generated. It compares the key expiry date with the date held by its real-time clock 149 and, if the key is thereby determined to have expired, then it discards the data packet. Equally, if the CommandTime is later than the current time held on the clock 149 or is outside of a range of a few seconds earlier than the current time, then the packet is discarded. If the received Command data packet passes these initial validation checks, then it proceeds, at step 404, to reverse calculate the checksum. The checksum (or data representative thereof) and all but one of the pieces of data used to calculate it, are included in the header. The remaining value, i.e. the value used to determine the base key used to generate the encryption key, is the only piece missing. There are a number of ways to reverse calculate the equation or algorithm to identify the missing data. In an example, the missing data may be an Access level defined in terms of a set of, for example, ascending integers 1 to x. Each access level may represent a degree of control that the specified user has in relation to the MU/MPU device. For example, if the MCU/MPU device is configured to control the use of a room, Access level 1 could represent control of lights and doors, Access level 2 could define door control only, Access level 3, lights only, Access level 4, all room functions plus booking permissions, etc. In this case, the security module may be configured to simply perform a plurality of iterations of the checksum calculation using the data it knows and an integer from 1 to x, incrementing that integer through each iteration until the resultant checksum matches the checksum identified in the header.

At step 406, once the data defining the base key selection has been identified from the matching checksum calculation, that base key can be selected by the security module 148 from its own store of base keys and used to generate the encryption key in the same manner as it was generated by the KIP 106 for the user control device 102.

At step 408, the security module decrypts the Command message. It is envisaged that the Command message will include more than just the Command itself, but also some bytes of data that can be used to further validate the Command message. For example, the Command message may include data indicating the character length of the Command itself, it may again include the CommandTime, and even data pertaining to the user (i.e., a OwnerID). If so, once the Command message has been decrypted, the security module 148 may be configured to perform further validations against this additional data. For example, if the Owner ID does not match that in the header, the packet is discarded. If the CommandTime in the Command message does not match that in the header, the packet is discarded. The signature, if present in the Command message, may be recalculated and the result checked against the signature in the decrypted Command message and, if it does not match the packet is discarded.

Once these additional validations have been successfully completed, the security module may be configured to, at step 412, concatenate just the CommandTime and the decrypted CommandData itself and send that concatenated data to the MCU/MPU for processing and action.

Figure 5A:
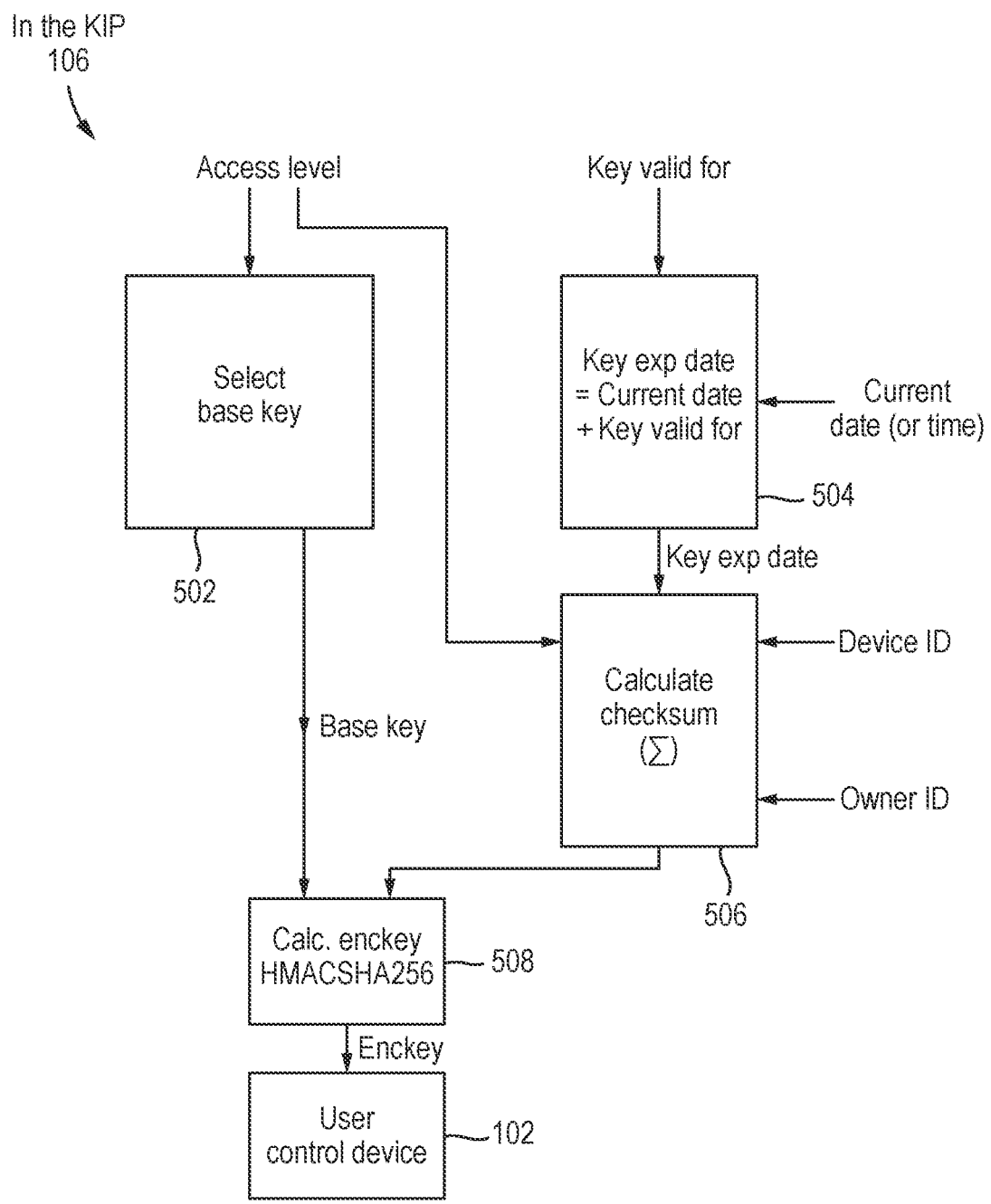
FIG. 5A is a schematic diagram illustrating an example process in a key issuing platform according to an exemplary embodiment of the present invention.
Figure 5B:
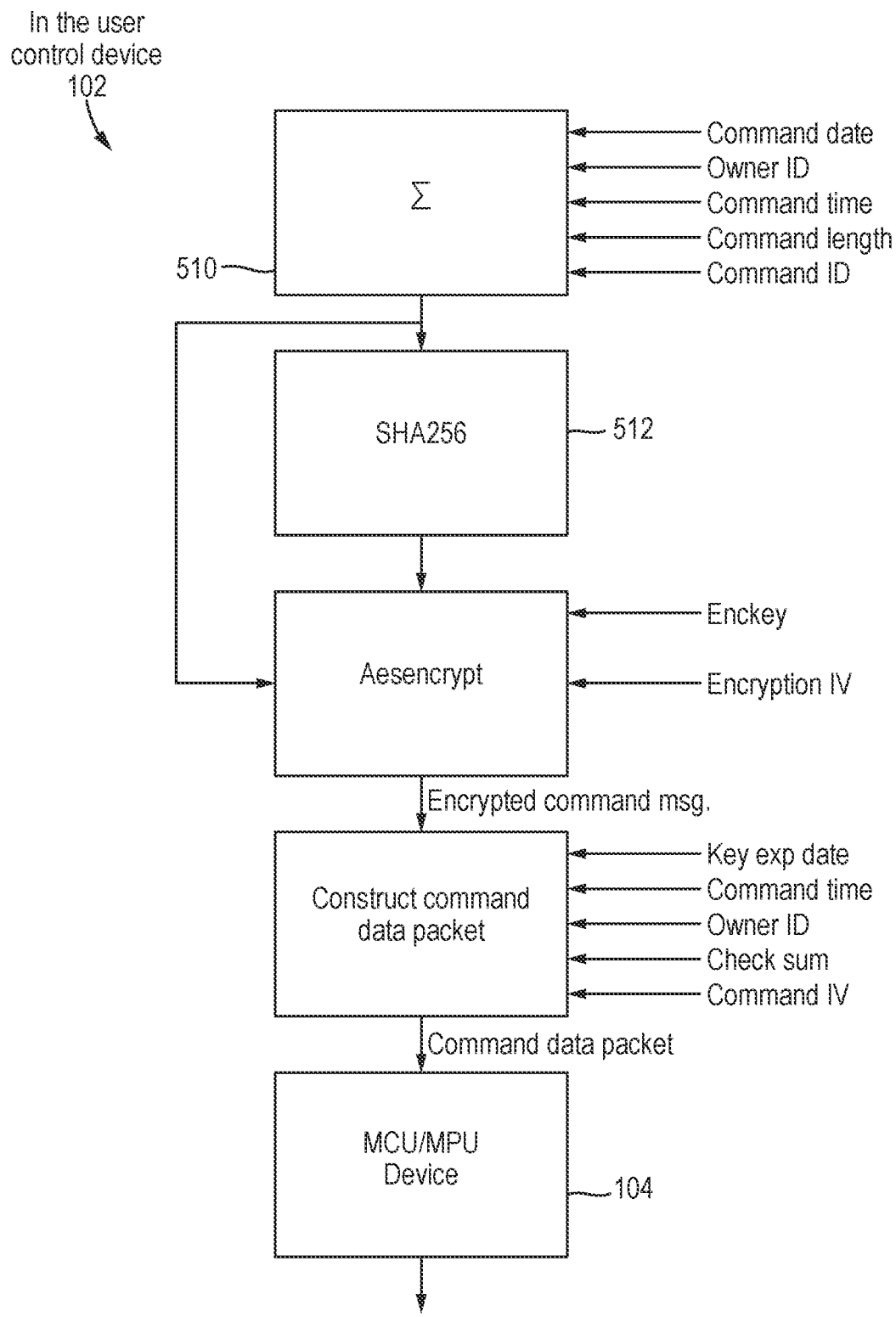
FIG. 5B is a schematic diagram illustrating an example process in a user control device according to an exemplary embodiment of the present invention.

Referring to FIGS. 5A, 5B and 5C of the drawings, and drawing all the above examples and embodiments together, a complete example process will now be described in more detail. The process starts when a user control device 102 (which could be previously unknown to the MCU/MPU device 104) generates request data requesting a new key to enable it to issue a Command to the MCU/MPU 104, thereby causing it to perform a specific task. The request data, which is sent by the user control device 102 to the key issuing platform (KIP) 106, includes (at least) OwnerID (which comprises an identifier (e.g., a number) pertaining uniquely to the user (or their device)), and DeviceID (which comprises an identifier (e.g., a number) pertaining uniquely to the MCU/MPU device to which the Command is to be issued). In an example, the OwnerID could be a four digit number unique to the user, such as '1001' and the DeviceID could be a six-digit number unique to the MCU/MPU device 104, such as '220280', but the invention is by no means limited in this regard. The request data is sent to the KIP 106 via the communications network 108.

As described above, the KIP 106 first checks the user's credentials and that they are authorised to issue such a Command to the MCU/MPU device 104. For example, the user may be required to pre-register with a service associated with the MCU/MPU device 104 in order to obtain keys to access it, and the level of such registration may define the types of tasks a user is permitted to cause the MCU/MPU device 104 to perform.

The KIP 106 and the MCU/MPU device 104 both have a number (n) of base encryption keys. Base encryption keys, in this example, are simply relatively short alphanumeric code words that can be used for longer encryption keys during the process. The plurality of base keys are hierarchically labelled in terms of AccessLevels or permissions, in that each base key is associated with a different level of access (to the MCU/MPU device 104) and, in this example, each AccessLevel is denoted by respective integers 1 to x. Accordingly, each base encryption key is associated with a respective Command ID group, whereby each Command ID group identifies a set of Commands which can be processed (by the MCU/MPU device 104) with the base key for that permission level. Once the KIP 106 has determined that the user (defined by the OwnerID data in the encryption key request) is authorised to issue Commands to the MCU/MPU device 104, it retrieves that user's permission level (AccessLevel) and the time period (KeyValidFor) for which the encryption key should be valid. It also, at step 502, retrieves a base key for the Command ID group linked to the user's AccessLevel. It will, therefore, be clear that the AccessLevel identifier (e.g., '1') defines the base encryption key (e.g., 'BaseKey 1') to be used to generate the encryption key.

Thus, in a simple example, BaseKey 1 is a base encryption key linked to AccessLevel 1 and BaseKey1='ABCD'; BaseKey2 is a base encryption key linked to AccessLevel2 and BaseKey2='EFGH'; and BaseKey3 is a base encryption key linked to AccessLevel3, and BaseKey3='IJKL'. The BaseKeys and the associated AccessLevels are stored in the KIP 106 and the security module of the MCU/MPU device 104.

The KIP 106, having verified the user, their AccessLevel and the time period (KeyValidForDays) for which an associated key should be valid, retrieves the base key (step 502) that is linked to their AccessLevel from the set of base encryption keys. Accordingly, in an example, a new user is verified and determined to have permissions corresponding to AccessLevel 1, permitting keys to be valid for 30 days. The KIP 106 retrieves BaseKey1 ('ABCD').

At step 504, the KIP 106 calculates a key expiry date: KeyExpDate=Current date (derived from the RTC 107 in the KIP 106)+KeyValidForDays. YYYYMMDD+30. E.g., 20210130+30. KeyExpDate=20210301

Next, at step 506, it calculates a value, known herein as 'CheckSum', that essentially combines a number of key data, derived from the request data, to generate a single data item (in this case, number) representative of a combination of that key data. In an example, the key data comprises DeviceID, KeyExpDate, AccessLevel and OwnerID; and, in an example, this key data, which all comprise numbers, are arithmetically summed (i.e., simply added together) to generate a new number representative of a combination of all of the key data.

For example: Checksum=DeviceID+KeyExpDate+AccessLevel+OwnerID. E.g., 220280+20210301+1+1001. Checksum=20431442.

Finally, at step 508, the KIP 108 calculates the new encryption key for the user control device 102. AccessLevel is '1', so BaseKey 1 is selected (e.g. 'ABCD' as referenced above). The new encryption key is generated using a cryptographic algorithm applied to the above-referenced Checksum and the selected base encryption key. In an example, a keyed hash algorithm may be used. In a specific example, the HMACSHA256 algorithm may be used. HMACSHA256 is a keyed hash algorithm which will be well known to a person skilled in the art, and is commonly used in the field of cryptography as a Hash-based Message Authentication Code Other suitable HMAC implementation include HMACMD5 and HMACSHA1, and others will be known to a person skilled in the art. In this specific example, the HMACSHA256 algorithm is used, but the present invention is by no means intended to be limited in this regard.

Figures 6A, 6B:
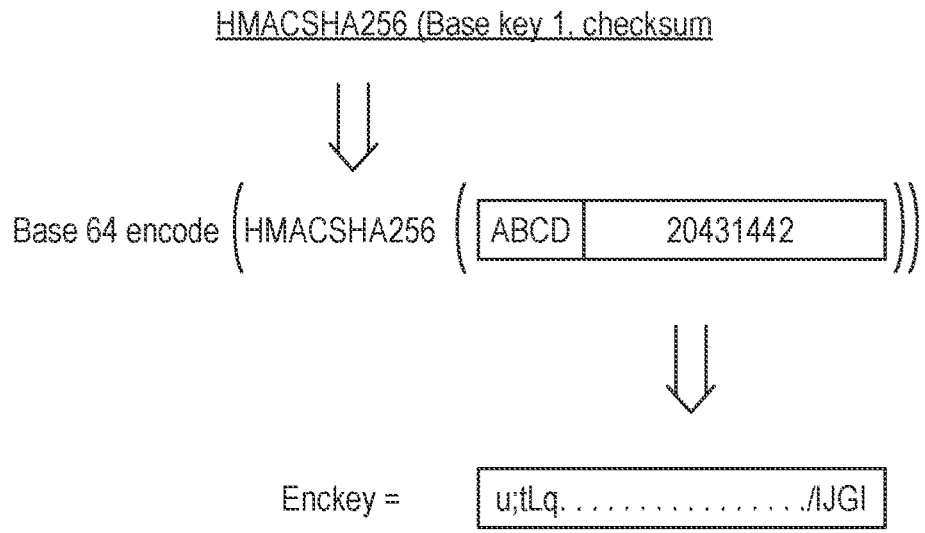
FIG. 6A is a schematic diagram illustrating the data transforms associated with the process of FIG. 5A.
FIG. 6B is a schematic diagram illustrating the data transforms associated with the process of FIG. 5B.

Referring additionally to FIG. 6A, at step 508, the KIP 106 transforms the BaseKey 'ABCD' and Checksum into a new (secret) encryption key (EncKey) unique to the user control device request, by applying the HMACSHA256 encryption algorithm to the selected BaseKey and the calculated Checksum:
HMACSHA256 (BaseKey, Checksum)→BASE64-ENCODE(HMACSHA256(ABCD, 20431442))→EncKey=I/9EZY90k0h0S9qmVxgQPZ2t88QXT5nQCtfPUaGHzY=

The KIP 106 then sends the calculated EncKey, together with data representative of the Checksum and KeyExpDate, to the user control device 102 via the communications network 208; and the EncKey data, together with the checksum and KeyExpDate data, is received by the user control device 102 and stored until it is required to send Command data to the MCU/MPU device 104 (if not immediately).

The encryption key is retrieved and used when a user control device wishes to send Command Data to the MCU/MPU device 104. For example, if the MCU/MPU device 104 is an electronic door access control device, having functionality that selectively unlocks a door in response to a valid Command message from a user control device, the Command data required to be sent by the user control device 102 might be 'OPEN', but this element will vary greatly by application, and the present invention is by no means intended to be limited in this regard. However, purely by way of example, and for the aid of understanding, the Command packet to be sent by the user control device 102 in order to effect the Command data 'OPEN', may have the following attributes:

CommandTime (i.e., the time, taken from the real-time clock 103, at which the Command packet is generated): YYYYMMDD HH:MM; e.g. 20210222 12:30.

CommandID (a unique identifier pertaining to this Command packet: e.g., 2000

CommandData e.g. 'OPEN'

EncryptionIV e.g. 1234567890123456

The EncryptionIV is an encryption initialisation vector, as will be familiar to a person skilled in the art, and is simply a random, or at least unique, input to the cryptographic algorithm (i.e. the encryption algorithm that will be used to encrypt the Command message) to provide the initial state.

Referring now to FIG. 5B of the drawings, at step 510, the user control device 102 arithmetically sums the CommandData, OwnerID, CommandTime, CommandLength and CommandID and, at step 512, uses result to generate a cryptographic signature (thereby effectively 'signing' the summed result of these attributes and data items. The cryptographic signature is generated by using a keyed hash algorithm (e.g. SHA256, although others will be known to a person skilled in the art) in respect of the summed result. Thus, referring additionally to FIG. 6B of the drawings, the user control device first constructs a data package comprising the values of CommandData, OwnerID, CommandTime, CommandLength and CommandID as referenced above. Then, it signs the sum of these data to create a signature block (at step 514) and appends the signature block to the data package.

At step 516, the data package including the signature block is encrypted to generate a Command body (or Command data packet payload). Any known encryption method could be used at this stage. For example, AES encryption methods are well known to a person skilled in the art and will not be described in detail herein for the sake of clarity. Suffice it to say that, in the illustrated example, an AES encryption method is performed in respect of the concatenation of:

OwnerID+CommandTime+CommandLength+CommandID+CommandData+Signature using the encryption key (EncKey) received from the KIP 106 and the encryption initialisation vector EncryptionIV described above. The resultant Command payload:

UjtLqGk75mLmdQVuisbFsYCofq+
0TIcD3Ovgyzr2g8XgwYTM06qUbwJN00SaATvYM
OvDX8X9aLiKcj34+v/3cpwYTie+
SMKqgv2JR7v1E8YnkPbeUX4Ga+MyffF/IJGf is appended to a plain value (unencrypted header) (at step 516) to construct a Command Data Packet, as illustrated in FIG. 6B. The plain value header is comprised of the key expiry date (KeyExpDate) (received with the encryption key from the KIP 106), the CommandTime determined at step 510, the OwnerID which is inherent and unique to the user, the Checksum (calculated by the KIP 106 at step 506 of the encryption key generation process and provided to the user control device with the encryption key) and the CommandID obtained at step 510.

The Command data packet is transmitted to the MCU/MPU device 104 and is received at the input 122 (FIG. 1) thereof. It is to be understood that the Command data packet could be transmitted to the MCU/MPU device 104 via any communications policy implemented in the application. Thus, for example, user control device 102 and the MCU/MPU device 104 could be configured to communicate with each other via protocols such as Bluetooth® WiFi, Ethernet, USB, UART, SERIAL, etc. and the present invention is not necessarily intended to be limited in this regard. Indeed, one of the key technical advantages of the present invention is that the MCU/MPU device 104 including the security module 148 does not need to be connected to the Internet (or other communications network 108) to receive and verify data packets from unknown user control devices 102. Accordingly, a Command data packet received at the input 122 of the MCU/MPU device 104 is transferred directly to the on-chip integral security module 148.

Referring now additionally to FIG. 5C of the drawings, in the security module 148, once a Command data packet has been received, an initial validation process is performed thereon, at step 518, in respect of the plain value contained in the (unencrypted) header. Using its real-time clock 149, the security model 148 determines the current date and time. Then, first, the KeyExpDate is compared with the current date and, if it has expired, the Command data packet is discarded. If not, it checks the CommandTime. If the CommandTime is earlier than the CommandTime of the last Command data packet received, or outside of a few seconds from the time held by the real-time clock 149, the Command data packet is discarded. If not, and these validations have been completed successfully, the process passes to step 520.

At step 520, the security module 148 calculates Checksum and thereby determines the encryption key used to encrypt the Command payload. From the plain value header data, the security module can determine:

OwnerID+KeyExpDate

The DeviceID is the unique identifier pertaining to the MCU/MPU device 104 in which the security module 148 is integrated and is, therefore, known to the security module 148. The plain value header also includes the Checksum value. Therefore, at this stage, the security module 148 knows:

OwnerID+DeviceID+KeyExpDate+[unknown]
AccessLevel=Checksum

From this, it is clear that the AccessLevel can be determined. In an example, the security module iterates through AccessLevel=1 to x (wherein x is the highest AccessLevel associated with the BaseKeys stored by both the KIP 106 and the security module 148 of the MCU/MPU device 104. At each iteration of the Checksum calculation, the security module 148 checks to see if the result matches the Checksum value in the Command data packet header. If not, it increments the AccessLevel value by 1 and repeats the Checksum calculation until, either all possible values of the AccessLevel have been tried and no match has been found (in which case the Command data packet is discarded), or a match is determined and, therefore, the AccessLevel number has been found.

Once the AccessLevel number is known, the associated BaseKey can be retrieved (at step 522) and the encryption key used to encrypt the Command data packet payload can be calculated (at step 523) in the manner described above, namely:

HMACSHA256(BaseKey,Checksum)=EncKey

The Command packet payload is then decrypted at step 524 using the EncKey thus calculated (which is the same EncKey provided to the user control device 102 by the KIP 106 at the start of the process).

Referring additionally to FIG. 6C, the Command data packet payload, now decrypted, comprises OwnerID, CommandTime, CommandLength, CommandID, CommandData and signature, just as the unencrypted Command payload illustrated schematically in FIG. 6B.

At step 526, a validation process is performed in respect of the decrypted Command payload. First, the OwnerID in the decrypted Command payload is checked against the OwnerID in the plain value header. If they do not match, the Command data packet is discarded. Also, the CommandTime in the decrypted Command payload is checked against the CommandTime in the plain value header and, once again, if they do not match, the Command data packet is discarded.

Next, a signature is calculated, as described above in respect of step 512 of FIG. 5B:

SHA256(OwnerID,CommandTime,CommandLength,
CommandID,CommandData)

wherein the OwnerID, CommandTime, CommandLength, CommandID and CommandData are all taken from the decrypted Command payload. If the signature does not match the signature in the decrypted Command payload, then the Command data packet is discarded. On the other hand, if there is a match at this stage, the Command data packet is now decrypted and fully validated.

The CommandTime is stored by the security module 148 of the MCU/MPU device 104 to prevent replay attacks and also to be used for validating future Command data packets (step 518, FIG. 5C).

At step 528 the CommandID and CommandData are extracted from the decrypted Command payload and concatenated, and the result returned to the MCU/MPU 116 for processing and action. In this specific example, the data returned to the processor 116 is:

CommandID=2000
CommandData=OPEN

In some examples, for additional security, the security module 148 may hold a paired key for EncKey. In this case, once the Command data packet has been decrypted and fully validated, the security module 148 would check to see if it holds a paired key for EncKey and, if not, it proceeds to step 528, as described above. However, if it does have a paired key, it still extracts and concatenates the CommandID and CommandData as described above but, before it sends it to the processor 116, it signs the concatenated data and appends the signature to the (unencrypted) data before sending it to the processor 116, as illustrated schematically in FIG. 6C. This final step is a method to enable the processor to verify that the data packet has been processed and validated by the security module 148. However, this is by no means essential, and simply adds an additional layer of security to the process should it be required for some applications.

It will be apparent from the foregoing description that the method and apparatus of the invention can be used in a variety of different applications, too numerous to list herein. However, for the sake of completeness, two potential applications are described below.

In a first example application, the MCU/MPU device is incorporated into a control system configured to control the door lock and lighting of a sports hall (e.g., a squash court) that can be booked and used 24 hours a day, 7 days a week. The booking system is automated, and provisioned by an app on a user's smart phone or other handheld computing device. The controller of the control system is configured to unlock the electronic door lock and switch on the lights in response to Command Data 'OPEN'. Alternatively, two separate control systems may be provided, each performing a separate function: a first for unlocking the door and a second for switching on the lights. The MCU controlling the lights, keeps the lights on for a predetermined period of time, say an hour, and then switches them off automatically when the timer expires, ready for the next user. The control system(s) may not have access to the sports club WiFi as the sports hall is too far away from the main building, and may instead be configured to communicate with user devices via a close range communication protocol such as Bluetooth®.

When a user wishes to book a slot in the sports hall, they use the app on their handheld device to select a court and a free slot. The app is configured to obtain an encryption key from a KIP in the manner described above and store it for future use. The encryption key will be time limited, in the sense that it will only be valid for the date/time slot booked by the user. Thus, the value for KeyValidFor will be set accordingly.

When the user arrives at the sports hall building, they open the app, select the sports hall or slot they have booked, and press a 'button' to cause a Command data packet to be transmitted (via e.g. Bluetooth®) to the input of a control system housed in a control box on the wall outside the sports hall. The integral security module in the control system holds the same set of base keys as the KIP that has issued the encryption key to the user.

The app is configured to use the encryption key received from the KIP at the time of booking the slot to construct a Command data packet as described above and transmit the Command data packet (comprising an unencrypted header and encrypted Command payload, as described above) to the input of the control system. The security module of the control system validates and decrypts the Command data packet in the manner described above and, if successful, forwards the Command data to the controller (MCU) that unlocks the door to the sports hall. If the same control system does not also control the lighting, the user may have to repeat the process with a separate control system to switch on the lighting.

Because the control system for the door does not require prior knowledge of the user or the time, they are required to access it, it is possible to manage an unlimited number of bookings for different people at different times, without the need for access to the Internet.

In another example, a method and apparatus for controlling the use of drones is envisaged. A company may have several drones stored at various different locations for deployment at different times and into different areas. Whilst a drone is in storage, it must not be possible to activate or control the drone and it is imperative that if a drone is lost or stolen, unauthorised use of it is prevented. Additionally, if different users need to access a single drone at different times or multiple users need to control the drone at the same time but cannot share keys, the drone will need to be made user aware which would normally require programming for each mission.

However, these issues can be circumvented using a method and apparatus according to an exemplary embodiment of the invention. Each drone includes a control system that includes an integral security module such as described generally above. A remote KIP can be informed, for example, that user X can access drone A in 2 days' time and they are allowed to access and control it for 14 days. When user X requires access to the drone 2 days later, they can request a valid encryption key from the KIP and use it to send valid Command data packets to the control system of the drone, thereby enabling them to control it until the 14 days has elapsed. At that point, the KeyExpDate will have passed, and the security module of the control system will no longer successfully validate Command data packets. However, if the time period needs to be extended, the KIP can be informed and user X can request a new valid encryption key to enable them to continue sending Command data packets to the control system, thereby enabling continued operation without the need to be programmed.

As a result, access to each drone can be restricted to specified users for specified dates and/or periods of time in the future. It is also possible to extend an operational time period for a user, as described above, without the drone having to be reprogrammed. Because there is no fixed key/password, a drone in service will remain secure. In the event that a drone is lost or stolen, the KIP can mark it as out of service such that no further keys would be issued for it.

It will be apparent to a person skilled in the art, from the foregoing description, that modifications and variations can be made to the described embodiments without departing from the scope of the invention as defined by the appended claims.

What is claimed is:

1. A computer-implemented method, performed in a user control device, for generating and transmitting a Command data packet including Command data for operating a control unit, the Command data having a plurality of attributes associated therewith, the method comprising, under control of a processor of said user control device:

requesting, from a remote key issuing platform, a time-limited encryption key, and receiving said time-limited encryption key from said key issuing platform, said time-limited encryption key being generated by said key issuing platform using a base key selected according to a specific one or more of said attributes associated with said Command data;

receiving, with said time-limited encryption key from said key issuing platform, a Checksum value representative of at least a subset of said plurality of attributes of said Command data including said specific one or more attributes used by the key issuing platform to select the base key;

encrypting at least said Command data using said time-limited encryption key;

constructing a Command data packet comprising a plain value header and an encrypted Command Payload, said plain value header including:

data representative of said subset of said plurality of attributes of said Command data except the specific one or more attributes used by the key issuing platform to select the base key; and said Checksum value;

said Command payload comprising at least the encrypted Command Data; and transmitting said Command data packet to a said control unit.

2. The method according to claim 1, further comprising receiving, with said time-limited encryption key from said key issuing platform, a key expiry date and including data representative thereof in said plain value header of said Command data packet.

3. The method according to claim 1, wherein requesting a time-limited encryption key comprises generating request data including data representative of the user control device and the control unit to which a Command data packet is required to be transmitted and transmitting said request data to said remote key issuing platform.

4. The method according to claim 1, wherein constructing a Command data packet comprises:

constructing a plain value data package comprising said Command data and a plurality of attributes associated therewith, generating a signature in respect of said plurality of plain value attributes and appending said signature to said plain value data package to generate a signed data package;

encrypting, using said time-limited encryption key, said signed data package to generate an encrypted Command payload; and appending said encrypted Command payload to said plain value header.

5. The method according to claim 1, wherein said plain value header includes data representative of a Command time extracted from a real time clock of said user control device, and an owner ID representative of a user of said user control device.

6. A computer-implemented method, performed in a control unit including a security module and a control processor, for receiving, validating, and implementing valid Command data received from a user control device, said security module having stored therein a plurality of base keys, the method comprising, under control of a processor of said security module:

receiving a Command data packet from a user control device, said Command data packet comprising a plain value header and an encrypted Command Payload, said Command payload comprising at least Command data encrypted by a time-limited encryption key; said plain value header including:

data representative of said subset of said plurality of attributes of said Command data except the specific one or more attributes used by a key issuing platform to select a base key from which said encryption key was generated; and said Checksum value;

using attribute data contained in said plain value header and said Checksum value, determining said one or more specific attributes;

selecting a base key from said stored base keys associated with said specific one or more attributes;

using said selected base key to calculate said encryption key;

using said encryption key to decrypt said Command payload including said Command data; and forwarding said decrypted Command data to said control processor.

7. The method according to claim 6, comprising using said selected base key and said Checksum value to calculate said encryption key.

8. The method according to claim 6, wherein said plain value header includes data representative of a key expiry date and/or time associated with said Command data packet, and the method further comprises checking said key expiry date against the date and/or time held in a real time clock of said security module.

9. The method according to claim 6, wherein one of said Command data attributes is a Command time and data representative thereof is included in the plain value header of the Command data packet, the method further comprising comparing said Command time against previously-stored Command times and/or a time held by a real time clock of the control unit to determine if the Command time is valid and, if not, discarding said Command data packet.

10. A computer-implemented method performed in a key issuing platform for generating time-limited encryption keys for use by one or more remote user control devices in relation to one or more control units, the method comprising, under control of a processor of the key issuing platform:

receiving a request for a time limited encryption key from a remote user control device, said request including data representative of said user control device and a control unit to which it wishes to issue Commands;

determining one or more specific Command data attributes and selecting, from a set of stored base keys, a base key corresponding to said one or more specific Command data attributes;

calculating a Checksum value representative of at least a subset of a plurality of attributes of said Command data including said specific one or more Command data attributes used to select the base key;

calculating an encryption key using said selected base key; and transmitting said encryption key to a said user control device, together with data representative of said Checksum value and said key expiry date.

11. The method according to claim 10, wherein said encryption key is calculated using said base key and said Checksum value.

12. The computer-implemented security module for integration onto a control unit chip, the security module having a processor and a memory and a stored plurality of base keys, and is configured, under control of the processor, to execute instructions stored in the memory to perform a method according to claim 6.

13. The computer-implemented control unit comprising an integrated circuit having a security module according to claim 12.

14. The computer-implemented user control device comprising a processor and a memory, and being configured, under control of the processor, to execute instructions stored in the memory to perform a method according to claim 1.

15. The computer-implemented cryptographic key issuing platform comprising a processor and a memory and being configured, under control of the processor, to execute instructions in the memory to perform a method according to claim 1.

16. The non-transitory storage medium storing instructions which, when executed by a processor, cause the processor to perform the method of claim 1.

17. A communications system comprising
a user control device comprising a processor and a memory, and being configured, under control of the processor, to execute instructions stored in the memory to perform a method according to claim 1,
a server and a cryptographic key issuing platform comprising a processor and a memory and being configured, under control of the processor, to execute instructions in the memory to perform a method according to claim 1,
the server having an integrated security module, having a processor and a memory and a stored plurality of base keys, and is configured, under control of the processor, to execute instructions stored in the memory to perform a method comprising the steps of:
receiving a Command data packet from a user control device, said Command data packet comprising a plain value header and an encrypted Command Payload, said Command payload comprising at least Command data encrypted by a time-limited encryption key,
said plain value header including data representative of said subset of said plurality of attributes of said Command data except the specific one or more attributes used by a key issuing platform to select a base key from which said encryption key was generated, and said Checksum value,
using attribute data contained in said plain value header and said Checksum value, determining said one or more specific attributes,
selecting a base key from said stored base keys associated with said specific one or more attributes,
using said selected base key to calculate said encryption key,
using said encryption key to decrypt said Command payload including said Command data, and
forwarding said decrypted Command data to said control processor;
said security module and user control device being communicably couplable to the cryptographic key issuing platform via a communications network, and the user control device being communicably couplable to the server via a specified communications link, the user control device having an input for receiving an encryption key from the cryptographic key issuing platform via said communications network and an output for transmitting an encryption key request to the cryptographic key issuing platform and an output for transmitting a Command data packet to said server.

* * * * *